United States Patent [19]

Ohta et al.

[11] Patent Number: 4,841,037

[45] Date of Patent: Jun. 20, 1989

[54] AMINO SULFONAPHTHOLTRISAZO COMPOUNDS AND RECORDING LIQUIDS CONTAINING THE SAME

[75] Inventors: Tokuya Ohta; Masatsune Kobayashi; Yuko Suga; Konoe Miura; Hiroshi Takimoto, all of Yokohama; Tomio Yoneyama, Kawasaki, all of Japan

[73] Assignees: Canon Kabushiki Kaisha; Mitsubishi Chemical Industries Limited, both of Tokyo, Japan

[21] Appl. No.: 872,605

[22] Filed: Jun. 10, 1986

[30] Foreign Application Priority Data

Jun. 11, 1985 [JP] Japan ................................. 61-126987
Jun. 11, 1985 [JP] Japan ................................. 61-126988
Jun. 11, 1985 [JP] Japan ................................. 61-126990
Jun. 11, 1985 [JP] Japan ................................. 61-126991

[51] Int. Cl.$^4$ ..................... C09B 31/27; C09B 33/22; C09D 11/16
[52] U.S. Cl. ........................................ 534/815; 106/2; 106/21; 106/22; 106/23; 534/582; 534/583; 534/678; 534/680; 534/687; 534/728; 534/806; 534/810; 534/811; 534/829; 534/832; 534/837; 534/876
[58] Field of Search ............... 534/680, 806, 687, 678, 534/811, 810, 815, 728; 106/21, 22, 23

[56] References Cited

U.S. PATENT DOCUMENTS

| | | | |
|---|---|---|---|
| 615,497 | 12/1898 | Ris et al. | 534/680 |
| 2,018,234 | 10/1935 | Smith et al. | 534/680 |
| 2,427,539 | 9/1947 | Wehrli | 534/806 X |
| 4,255,327 | 3/1981 | Brode | 534/680 |
| 4,508,570 | 4/1985 | Fujii et al. | 106/22 X |
| 4,557,761 | 12/1985 | Kobayashi et al. | 106/22 |
| 4,592,756 | 6/1986 | Kawasaki et al. | 106/22 X |

FOREIGN PATENT DOCUMENTS

| | | | |
|---|---|---|---|
| 0021837 | 1/1981 | European Pat. Off. | 534/806 |
| 3021979 | 1/1982 | Fed. Rep. of Germany | 534/806 |
| 60-168743 | 9/1985 | Japan | 534/806 |
| 0116575 | 9/1982 | Poland | 534/806 |
| 19743 | of 1893 | United Kingdom | 534/806 |
| 1446326 | 8/1976 | United Kingdom | 534/806 |
| 2046289 | 11/1980 | United Kingdom | 534/806 |
| 2083834 | 3/1982 | United Kingdom | 534/806 |

OTHER PUBLICATIONS

The Color Index, Third Edition, vol. 4, Items 31600; 31660; 34170; 34175 and 34179.

*Primary Examiner*—Floyd D. Higel
*Attorney, Agent, or Firm*—Fitzpatrick, Cella, Harper & Scinto

[57] ABSTRACT

A naphthalene trisazo compound represented by the general formula (I) or (II):

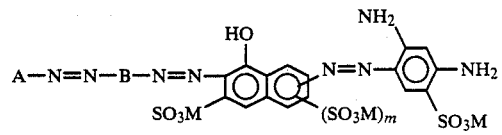

wherein A and B each represents a substituted or unsubstituted benzene or naphthalene ring; m represents zero or 1; and M represents an alkali metal atom, ammonium or H.Am (wherein Am represents an amine); or

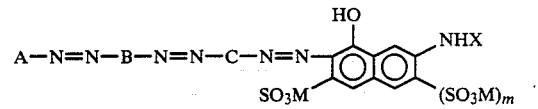

wherein X represents a hydrogen atom, a lower alkyl group, a phenyl group or a phenyl group substituted by —SO$_3$M; m represents zero or 1; M represents an alkali metal atom, ammonium or H.Am (wherein Am represents an amine); A, B and C each represents a substituted or an unsubstituted benzene or naphthalene ring, provided that B and C do not represent a naphthalene ring at the same time. A recording liquid containing these compounds is suitable for use in an ink-jet recording system.

17 Claims, 2 Drawing Sheets

AMINO SULFONAPHTHOLTRISAZO COMPOUNDS AND RECORDING LIQUIDS CONTAINING THE SAME

FIELD OF THE INVENTION

The present invention relates to novel water-soluble trisazo compounds which can be used either as blue to black dyes or as blue to green dyes. The present invention also relates to recording liquids containing such water-soluble trisazo compounds. More specifically, the present invention relates to novel naphthalene trisazo dyes suitable for use in recording liquids, novel recording liquids containing said dyes, particularly ones which are suitable for use in a recording system wherein recording is performed by ejecting recording liquid droplets through fine spouts (discharging orifices) on the recording head, and a recording method employing such recording liquids.

BACKGROUND OF THE INVENTION

For recording on recording media such as papers, etc., by writing instruments (e.g., a fountain pen, a felt pen, etc.), there have hitherto been used inks, which are solutions of various dyes dissolved in water or organic solvents.

It is also known that in a so-called ink-jet recording system wherein recording is performed by ejecting a recording liquid in a recording head through discharging orifices by vibration of piezo oscillators, the electrostatic attraction caused by the application of a high voltage, etc., recording liquids obtained by dissolving various dyes in water or organic solvents are used. However, of the ink-jet recording liquid, more rigorous performance characteristics are requested than for a general writing ink for writing instruments such as a fountain pen, a felt pen, etc.

In such a recording system recording is performed by ejecting droplets of a recording liquid (a recording ink) onto a recording media, such a recording liquid is fundamentally composed of a recording agent (a dye or a pigment) and a liquid medum (water, an organic solvent or a mixture of them) for dissolving or dispersing the recording agent and, if necessary, various additives are added to the recording liquid.

Preferred conditions required for this kind of recording liquid are as follows:

(1) The recording liquid possesses liquid properties (viscosity, surface tension, electric conductivity, etc.) matching the discharging conditions (a driving voltage and a driving frequency of a piezo electric element, the form and material of orifices, the diameter of orifices, etc.).
(2) The recording liquid can be stored for a long period of time and does not cause clogging of orifices during use.
(3) The recording liquid is quickly fixed onto recording media such a papers, films, etc., the outlines of the resulting ink dots are smooth, and blotting of the dotted ink is minimized.
(4) The recorded image of the recording liquid has a clear color tone and a high density.
(5) The recorded image of the recording liquid is excellent in water resistance and light resistance.
(6) The recording liquid does not attack or erode surrounding materials (the container for the recording liquid, connecting tubes for discharging orifices, sealants, etc.).
(7) The recording liquid has no unpleasant smell, toxicity, inflammability, etc.

As this kind of recording liquid, there are known solutions or dispersions of various dyes or pigments in aqueous or nonaqueous solvents as disclosed, for example, in Jaspanese Patent Publication Nos. 8361/1975, 40484/1976, 13126/1977 and 13127/1977, and Unexamined Published Japanese Patent Application No. 95008/1975. However, none of these prior art recording liquids are completely satisfactory since they do not possess all of the features (1) to (7) required for ideal recording liquids.

Recording liquids are basically composed of dyes and solvents therefor, and their performance depends largely upon the inherent properties of the dyes. Therefore, choosing dyes that provide recording liquids with the desired features (1) to (7) is a very important factor in the art concerned.

Trisazo compounds known as black dyes have the following formulae:

C.I. Direct Black-38

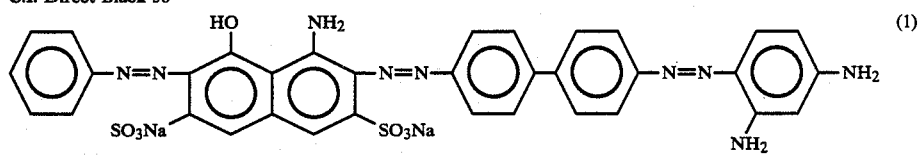

C.I. Direct Black-9

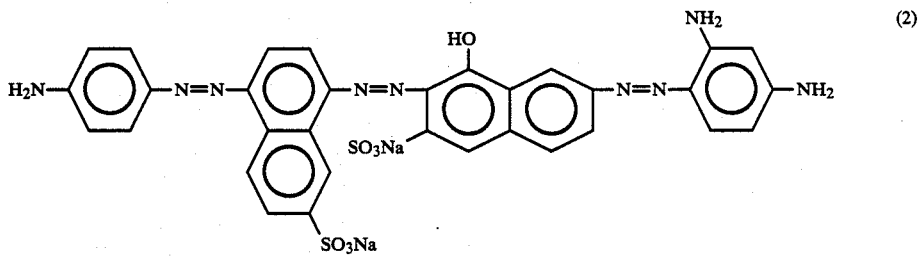

Compounds known as blue and green dyes have the following formulae, respectively:

C.I. Direct Blue-78 (3)

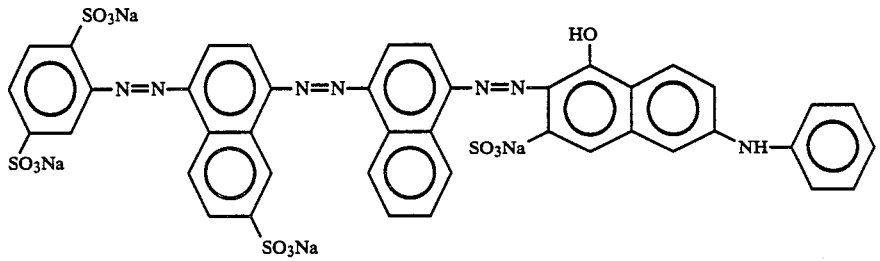

C.I. Direct Green-33 (4)

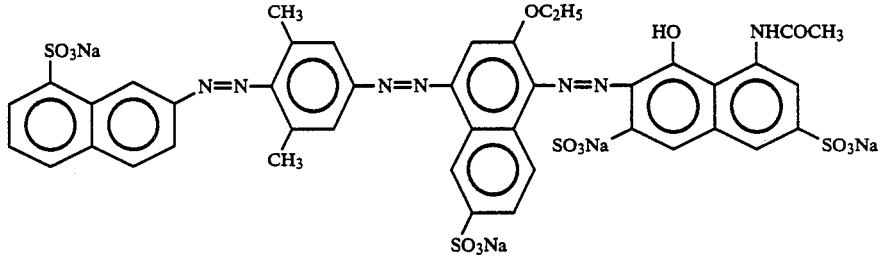

These dyes, however, are unsatisfactory for use in recording liquids and further improvements are desirable with respect to solubility, light resistance, stability in extended storage, and stability during discharging.

SUMMARY OF THE INVENTION

One object, therefore, of the present invention is to provide novel trisazo compounds which can be used either as blue to black dyes or as blue to green dyes.

Another object of the present invention is to provide novel recording liquids which contain said compounds as dyes and which satisfy all of the requirements (1) to (7) listed above.

The novel dyes of the present invention are naphthalene trisazo compounds which are represented by the following formula (I) or (II):

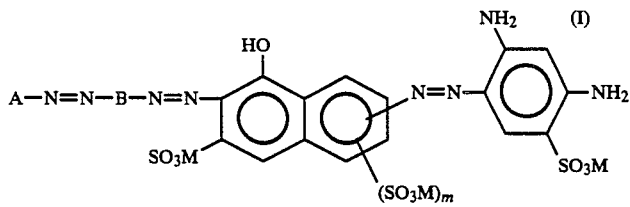

wherein A and B each represents a substituted or unsubstituted benzene or naphthalene ring; m represents zero or 1; and M represents an alkali metal atom, an ammonium or H.Am (wherein Am represents an amine): or

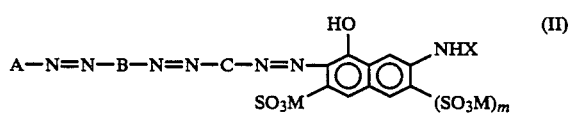

wherein X represents a hydrogen atom, a lower alkyl group, a phenyl or a phenyl group substituted by —SO$_3$M; m represents zero or 1; M represents an alkali metal atom, H.Am (wherein Am represents an amine); A, B and C each represents a substituted or unsubstituted benzene or naphthalene ring, provided that B and C do not represent a naphthalene ring at the same time.

The recording liquid of the present invention comprises at least one dye selected from the group consisting of naphthalene trisazo compounds represented by formula (I) or (II) as a recording agent responsible for the formulation of a recording image, and a liquid medium for dissolving or dispersing said dye.

DESCRIPTION OF THE PREFERRED EMBODIMENT

Figure 1:
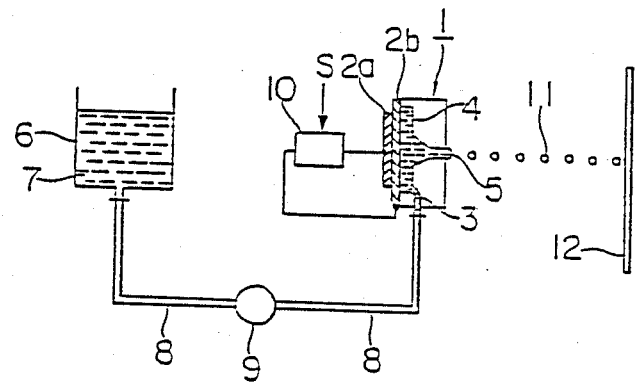
FIGS. 1 and 2 are schematic views showing ink-jet recorders.

The compounds represented by the formula (I) are blue or black dyes. Examples of the substituent which may be present on A and B include —SO$_3$M, a lower alkyl group, a lower alkoxy group, an amino group, a lower alkyl carbonylamino group, —COOM and a halogen atom. The term "lower" means the presence of 1 to 4 carbon atoms. M represents the same as defined hereinabove. Examples of Am include a substituted or unsubstituted alkylamine.

Preferable dyes of the formula (I) are those wherein A is a —SO$_3$M substituted naphthyl group, B is a phenyl group substituted by a lower alkyl or lower alkoxy group, M is Li or Na, and m is zero or 1.

The compounds represented by the formula (II) are blue to green dyes. Examples of the substituent which may be present on A, B and C include —$SO_3M$, a lower alkyl group, a lower alkoxy group, a lower alkyl carbonylamino group, —COOM, and a halogen atom. The term "lower" means the presence of 1 to 4 carbon atoms. M represents the same as defined hereinabove. Examples of Am include a substituted or unsubstituted alkylamine.

Preferable dyes of the formula (II) are those wherein A is a phenyl group which is substituted by —$SO_3M$ and which may be further substituted by a lower alkyl group or a lower alkoxy group, B is a phenyl group substituted by a lower alkyl or lower alkoxy group, C is a —$SO_3M$ substituted naphthyl group or a phenyl group which is substituted by a lower alkyl or alkoxy group, X is H, m is 1, and M is Na or Li.

The compounds of the present invention may be prepared by the following procedures in accordance with known methods such as, for example, the one described in Yutaka Hosoda, *Shin Senryo Kagaku* (*New Dyestuff Chemistry*), page 397, line 27 to page 398, line 19, published by Gihodo Co., Dec. 21, 1973:

An amine of the formula (III):

A—$NH_2$         (III)

(wherein A is the same as defined above) is diazotized with sodium nitrite or any other appropriate compound in a mineral acid such as hydrochloric acid or sulfuric acid, and the resulting diazotized amine is coupled with an amine of the formula (IV):

H—B—$NH_2$         (IV)

(wherein B is the same as defined above) to form a monoazo compound of the fomrula (IV):

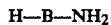

A—N=N—B—$NH_2$         (V)

(wherein A and B are the same as defined above).

If a compound of the formula (I) is desired, the monozao compound formed above is diazotized with sodium nitrite or any other appropriate compound in a material acid such as hydrochloric acid or sulfuric acid, and the resulting diazotized compound is coupled with a naphthol compound represented by formula (VI):

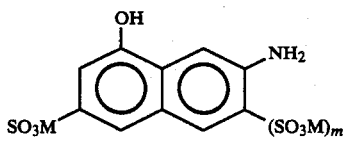

(VI)

(wherein m and M are the same as defined above) to form a disazo compound of the formula (VII):

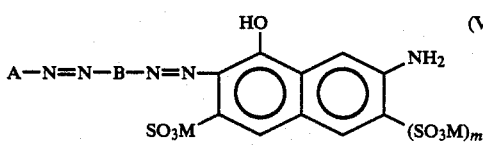

(VII)

(wherein A, B, M and m are the same as defined above).

The so formed disazo compound is diazotized with sodium sulfite or any other appropriate compound in a mineral acid such as hydrochloric acid or sulfuric acid or an organic acid such as acetic acid, and the resulting diazotized compound is coupled with metaphenylenediamine sulfonic acid to form the intended trisazo compound.

If a compound of the formula (II) is desired, the monoazo compound of formula (V) is diazotized with sodium nitrite or any other appropriate compound in a mineral acid such as hydrochloric acid or sulfuric acid, and the resulting diazotized compound is coupled with an amine of the formula (VIII):

H—C—$NH_2$         (VIII)

(wherein C is the same as defined above) to form a disazo compound of the formula (IX):

A—N=N—B—N=N—C—$NH_2$         (IX)

(wherein A, B and C are the same as defined above).

The so formed disazo compound is diazotized with sodium nitrite or any other appropriate compound in a mineral acid such as hydrochloric acid or sulfuric acid or an organic acid such as acetic acid, and the resulting diazotized compound is coupled with a naphthol compound represented by formula (X):

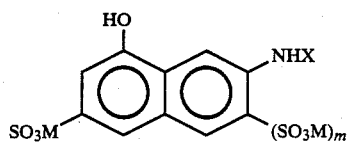

(X)

(wherein X, M and m are the same as defined above) to form the intended trisazo compound (II) of the present invention.

The recording liquid of the present invention is prepared using the trisazo compound of formula (I) or (II) as a recording agent. The resulting recording liquid satisfies all of the requirements (1) to (7) listed hereinabove and is particularly superior to recording liquids using the known dyes (1) to (4) in terms of stability in extended storage and prevention of the clogging of discharging orifices. The notable advantage of using the dye of formula (I) is that it provides a recording liquid having good response in discharging, while the dye of formula (II) ensures the production of a highly light-resistant recording liquid. Therefore, the recording liquid of the present invention offers definite advantages over the ones which employ known dyes.

Prevention of clogging of orifices is a very important subject matter in the ink-jet recording system from a viewpoint of reliability thereof. Hitherto it has been prevented mainly by using mechanical method such as an auto-capping method (surrounding a nozzle with a saturated vapor while the nozzle is not used) or a method using a hand-operated pump. However, such methods do not provide satisfactory effects at present.

In the ink-jet recording liquid a liquid meduim mainly comprising of water is used from a viewpoint of safety. Generally, a low volatile water soluble organic solvent such as a glycol is used as a wetting agent. Solubility of dyes to these liquid media changes delicately according on the chemical structure of the dyes, and solubility of dyes to water and that to a glycol have a tendency to be contrary to each other. At the top of the nozzle there is a tendency that water which is a highly volatile component volatilizes to make the concentration of a glycol high. Therefore, if the recording liquid contains a dye having a low solubility to a glycol, there is a large possibility for clogging the nozzle by precipitation of the dye.

The above-described conventional dyes (1) to (4) hav a good solubility to water, however, they are inferior in solubility to a glycol. On the other hand, the dyes of the present invention which are represented by formula (1) and (II) have an improved solubility to a glycol maintaining the solubility thereof to water to be in the range sufficient for practical use. Therefore, the recording liquid containing the dyes of the present invention hardly cause clogging of a nozzle.

The content of the dye in the recording liquid of this invention is determined according to the nature of the liquid medium component, the characteristics required for the recording liquid, etc., but is generally in the range of 0.1 to 20% by weight, preferably 0.5 to 15% by weight, more preferably 1 to 10% by weight to the total weight of the recording liquid.

The dyes in this invention can be used solely or as a combination of two or more kinds of them, or further may be used as the indispensable component together with other dye or dyes such as a direct dye, an acid dye, etc. the amount of such conventional dyes which can be used together with the dye of this invention is usually 0 to 30% by weight of the dye for use in this invention.

As a liquid medium component for the recording liquid of this invention, water or a mixture of water and a water-soluble organic solvent or solvents is used. Examples of the water-soluble organic solvents which can be used for the recording liquids of this invention are alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol, isobutyl alcohol, etc.; amides such as dimethylformamide, dimethylacetamide, etc.; ketones or ketone alcohols such as acetone, diacetone alcohol, etc.; ethers such as tetra-hydrofuran, dioxane, etc.; nitrogen-containing heterocyclic ketones such as N-methyl-2-pyrrolidone, 1,3-dimethyl-2-imidazolidinone, etc.; polyalkylene glycols such as polyethylene glycol, polypropylene glycol, etc.; alkylene glycols the alkylene moiety of which has 2 to 6 carbon atoms, such as ethylene glycol, propylene glycol, butylene glycol, triethylene glycol, 1,2,6-hexantriol, thiodiglycol, hexylene glycol, diethylene glycol, etc.; glycerol; lower alkyl ethers (the alkyl moiety having usually 1 to 4 carbon atoms) of polyhydric alcohols such as ethylene glycol methyl ether, diethylene glycol methyl (or ethyl) ether, triethylene glycol monomethyl (or ethyl) ether, etc.

The content of the foregoing water-soluble organic solvent in the recording liquid is usually in the range of 5 to 89.9% by weight, preferably 10 to 80% by weight, more preferably 20 to 50% by weight to the total weight of the recording liquid.

In this case, the content of water is determined in a wide range according to the nature of the foregoing solvent component, the composition of the solvents, and the desired characteristics of the recording liquid but is usually in the range of 10 to 90% by weight, preferably 10 to 70% by weight, more preferably 20 to 70% by weight.

The recording liquid of this invention can be easily prepared by mixing the necessary components by an ordinary manner without need of any troublesome procedures.

The recording liquids of this invention have balanced excellency by themselves in recording characteristics (e.g., a recording response, a stability of droplet formation, a discharging stability, a long continuous recording property, a discharging stability after resting the recording for a long period of time, etc.), a storage stability, a fixing property onto recording media, and the light resistance, weather resistance, water resistance, etc., of recorded images but for further improving these properties, the recording liquids may contain various additives conventionally known in the field of the art.

Examples of these additives are viscosity controlling agents (for usually imparting a viscosity of 1 to 20 c.p. to the recording liquids), such as polyvinyl alcohol, celluloses, water-soluble resins, etc.; surface tension controlling agents (for preferably adjusting the surface tension of the recording liquids to 40 to 65 dynes/cm), such as various cationic, anionic or nonionic surface active agents, diethanolamine, triethanolamine, etc.; pH-controlling agents (for preferably adjusting the pH of the recording liquids to 4 to 10), such as buffers; and fungicides such as sodium dehydroacetoacetate, 1,2-benziosthiazolin-3-one, 6-acetoxy-2,4-dimethylmetadioxane, etc.).

Also, for preparing the recording liquid of this invention which is used for an ink-jet recording system of a type that a recording liquid is charged with electricity, a specific resistance controlling agent such as an inorganic salt (e.g., lithium chloride, ammonium chloride, sodium chloride, etc.), etc., is added to the recording liquid.

Furthermore, when the recording liquid of this invention is applied to an ink-jet recording system of a type that a recording liquid is ejected by the action of heat energy, the thermal properties (e.g., the specific heat, the coefficient of thermal expansion, the heat conductivity, etc.) of the recording liquid is controlled by suitably selecting the kind of the solvent of the recording liquid, the component ratio of the recording liquid, etc.

The recording liquid of this invention possess the following merits. That is, the physical properties such as viscosity, surface tension, etc., thereof are in the proper ranges, the recording liquid does not clog fine discharging orifices of an ink-jet recorder, the recording liquid provides recorded images having high density, the recording liquid does not cause change in physical properties or deposition of solid components during the storage of the liquid, the recording liquid can record on various recording media without restriction of the kind of the recording media, and also the recording liquid is fixed quickly and gives recorded images excellent in water resistance, light resistance, abrasion resistance and resolution.

Then, an ink-jet recording system is explained hereinbelow.

There are various ink-jet recording systems according to the difference in the method of generating recording droplets and of controlling the ejection direction of the droplets.

An example of the recording systems is shown in FIG. 1. That is, FIG. 1 is a schematic view showing an ink-jet recording system which performs recording by applying recording signals to the recording head having a piezo electric oscillator to generate droplets of recording liquid in response to the recording signals. As shown in FIG. 1, a recording head 1 is provided with a piezo electric oscillator 2a, a vibration plate 2b, an inlet 3 for a recording liquid, a liquid-holding chamber 4, and a discharging orifice 5. A recording liquid 7 stored in a storage tank 6 is introduced into the liquid chamber 4 through a feed pipe 8. In addition, as the case may be, an intermediate treating means 9 such as a pump, filter, etc., is equipped to the feed pipe 8. Pulsed signals converted from recording signals S by a signal-processing means 10 (e.g., a pulse converter) are applied to the piezo electric oscillator 2a to vary the pressure of the recording liquid in the liquid chamber 4 in response to the pulsed signals, whereby the recording liquid 7 is ejected in the form of droplets 11 from the discharging orifice 5 to make a record on the surface of a recording medium 12.

Figure 2:
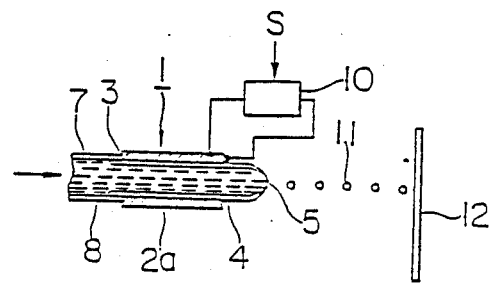

Besides the aforesaid ink-jet recording system, there are known various types of ink-jet recording systems. For example, FIG. 2 shows a modification in recording head 1 of the recording device shown in FIG. 1, in which a cylindrical piezo electric oscillator 2a is disposed around a nozzle-formed liquid-holding chamber 4. The mechanism of generating recording liquid droplets is fundamentally same as in the recording system shown in FIG. 1.

Moreover, there are known a ink-jet recording system in which electrically charged droplets are continuously generated and parts of the droplets are used for recording, and an ink-jet recording system in which thermal energy is applied to the recording liquid in the liquid chamber in a recording head in response to recording signals to generate droplets of the recording liquid by the thermal energy.

Figure 3A:
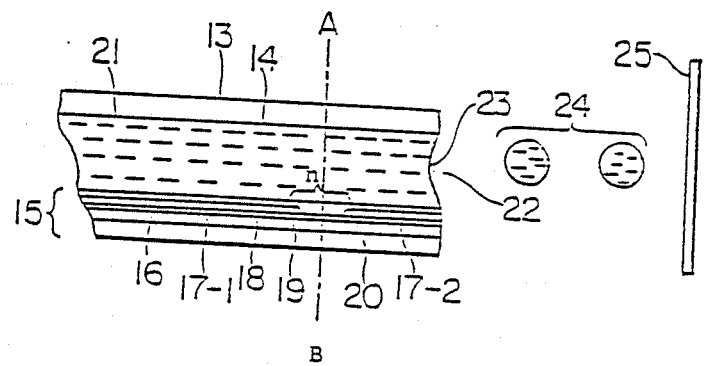
FIG. 3A is an enlarged sectional view of a head of an ink-jet recorder taken along the flowing passageway of ink.
Figure 3B:
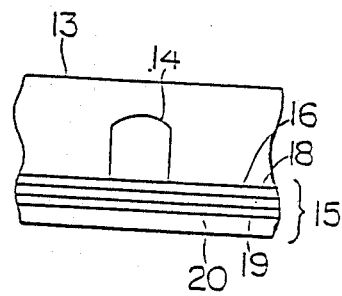
FIG. 3B is a cross-sectional view taken along line A–B of the head shown by FIG. 3A.
Figure 4:
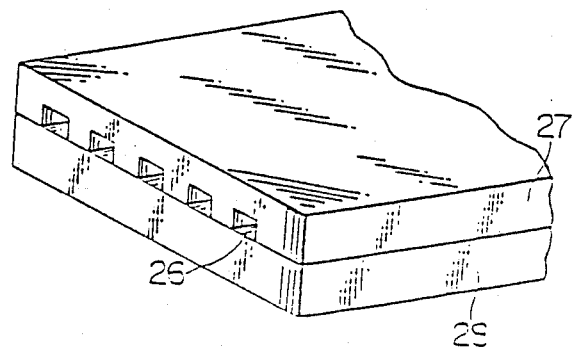
FIG. 4 is a perspective view of a multi-head which is an array of such heads as shown in FIGS. 3A and 3B.

An example of these recording systems is shown in FIG. 3A, FIG. 3B and FIG. 4.

A recording head 13 is composed of a glass, ceramic or plastic plate having an ink-passing channel 14 and a heating head 15, which is used for heat-sensitive recording, bonded to the plate. In addition, a thin film-type head is illustrated in FIG. 3A as the heating head 13 but the heating head for use in this invention is not restricted to the type. The heating head 15 is composed of a protective film 16 made of silicon oxide, etc., aluminum electrodes 17 - 1 and 17 - 2, a heating resistor layer 18 made of nichrome, etc., a heat accumulating layer 19, and a substrate 20 having a good heat radiating property, such as alumina, etc.

An ink 21 is filled in the channel 14 up to a discharging charging orifice 22 and forms a meniscus 23.

Now, on applying electric signals onto the electrodes 17 - 1 and 17 - 2, the heating head 15 rapidly generates heat at the region shown by n to form bubbles in the ink 21 which is in contact with the region, the meniscus 23 of the ink is projected by the action of the pressure, and the ink 21 is ejected to a recording medium 25 from the discharging orifice 22 as recording droplets 24. FIG. 4 shows an external appearance of a multiple head composed of an array of a number of the recording heads shown in FIG. 3A. The multi-head is made by bonding a glass glass 27 having a number of channels 26 with a heating head 28 similar to the one illustrated in FIG. 3A.

FIG. 3A is a cross sectional view of the recording head 13 taken along the passageway of ink and FIG. 3B is a cross sectional view taken along line A–B in FIG. 3A.

The following synthesis examples and working examples are provided for the purpose of further illustrating the present invention but are in no sense to be taken as limiting.

SYNTHESIS EXAMPLE 1

(Synthesis of Dye No. 1-1 in Table 1)

(1) Preparation of the first diazo liquid:

To 600 ml of 3% hydrochloric acid, 30.2 g of 2-amino-naphthalene-4,8-disulfonic acid was added and the resulting mixture was stirred for 3 hours to form a uniform slurry. Ice (400 g) was added to the slurry to cool it to 3° C. An aqueous solution of sodium nitrite (7.3 g) in water (73 ml) was added to the cooled slurry. The mixture was stirred for 1 hour to 3° C. to effect diazotization and the residual sodium nitrite was removed by addition of sulfamic acid (3 g) so as to obtain the first diazo liquid.

(2) First coupling:

To 450 ml of water, 15.3 g of 2,5-dimethoxyaniline of the formula:

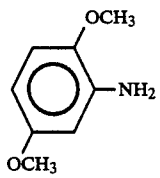

was added, and the resulting mixture was stirred for 2 hours to form a uniform slurry. To the slurry, 300 g of ice, the first diazo liquid prepared in step (1), and 20 ml of 25% sodium hydroxide aqueous solution were added and the mixture was stirred at 0°–3° C. and at a pH of 2–3 for 15 hours to effect coupling reaction. Thereafter, the mixture was subjected to salting-out with 200 g of sodium chloride. The precipitating monoazo compound was recovered by filtration, washed with 500 ml of 10% sodium chloride aqueous solution, and dried to obtain 41.0 g of a monoazo compound having the following formula:

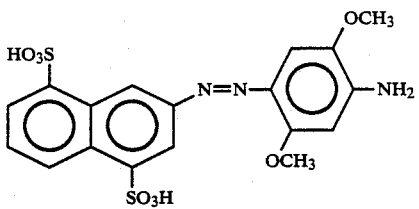

(3) Preparation of the second diazo liquid:

The monoazo compound (23.3 g) obtained in step (2) was added to 410 ml of 5% hydrochloric acid and the mixture was stirred for 5 hours to form a uniform slurry. The slurry was cooled to 3° C. by addition of 300 g of ice. An aqueous solution of sodium nitrite (3.8 g) in water (38 ml) was added to the cooled slurry. The mixture was stirred for 10 hours at 3° C. to effect diazotization and the residual sodium nitrite was removed by addition of sulfamic acid (1 g) so as to obtain the second diazo liquid.

(4) Second coupling:

To 460 ml of water, 12.0 g of 1-hydroxy-7-aminonaphthalene-3-sulfonic acid was added. To the resulting mixture, 800 g of ice, the second diazo liquid prepared in step (3) and 55 ml of 25% sodium hyddroxide aqueous solution were added, and the mixture was subjected to coupling reaction at 2°–5° C. and at a pH of 8–10. After stirring for 5 hours at the same temperature and pH, 250 g of sodium chloride was added to perform salting-out. The precipitating compound was recovered by filtration, washed with 300 ml of 10% sodium chlroide aqueous solution, and dried to obtain 31.3 g of a disazo compound having the following formula;

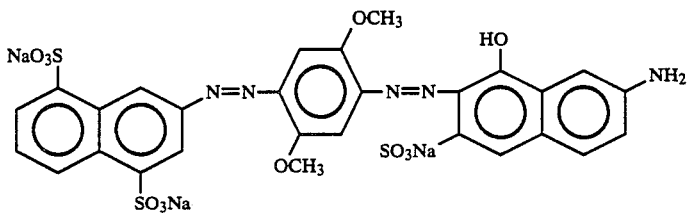

(5) Preparation of the third diazo liquid:

The disazo compound (19.6 g) obtained in step (4) was added to 400 ml of 3% hydrochloric acid and 100 ml of acetic acid. The mixture was stirred for 3 hours to make a uniform slurry, which was cooled to 3° C. by addition of ice (300 g). An aqueous solution of sodium nitrite (1.8 g) in wter (20 ml) was added to the cooled slurry. The mixture was stirred for 24 hours at 3° C. to effect diazodization, and the residual sodium nitrite was removed by addition of sulfamic acid (0.5 g) so as to obtain the third diazo liquid.

(6) Third coupling:

To 100 ml of water, 4.7 g of 1,3-diamino-benzene-4-sulfonic acid was added, and the mixture was cooled to 3° C. by addition of ice (50 g). After addition of the third diazo liquid prepared in step (5), the mixture was stirred at 2°–5° C. for 10 hours to effect coupling reaction. Thereafter, the mixture was subjected to salting-out with 250 g of sodium chloride. The precipitating compound was recovered by filtration and washed with 400 ml of 20% sodium chloride aqueous solution to obtain a wet cake (65 g). The cake was desalted and dried to obtain 18.6 g of the end compound (No. 1-1 in Table 1) in a yield of 74.1%. Elemental analysis of the compound gave the following result:

|  | C | H | N |
| --- | --- | --- | --- |
| Calculated (%) | 40.6 | 2.4 | 11.2 |
| Found (%) | 40.4 | 2.1 | 11.5 |

SYNTHESIS EXAPMLE 2

(Synthesis of Dye No. 1-3 in Table 1)

(1) Preparation of the first diazo liquid and first coupling:

The procedures of steps (1) and (2) in Synthesis Example 1 were repeated except that 22.3 g of 2-amino-naphthalene-5-sulfonic acid was used instead of 2-amino-naphthalene-4,8-disulfonic acid. As a result, 34.8 g of a monoazo compound having the following formula:

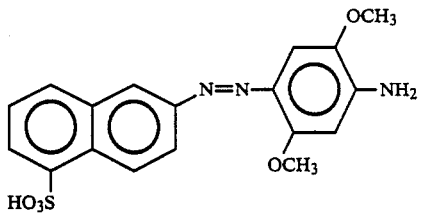

was obtained.

(2) Prepration of the second diazo liquid:

The second diazo liquid was prepared by repeating step (3) in Synthesis Example 1 except that 19.4 g of the monoazo compound obtained in step (1) was used as the starting material.

(3) Second coupling:

Step (4) in Synthesis Example 1 was repeated except that 16.0 g of 1-hydroxy-7-amino-naphthalene-3,6-disulfonic acid was used instead of 1-hydroxy-7-amino-naphthalene-3-sulfonic acid. As a result, 32.9 g of a disazo compound having the formula formula:

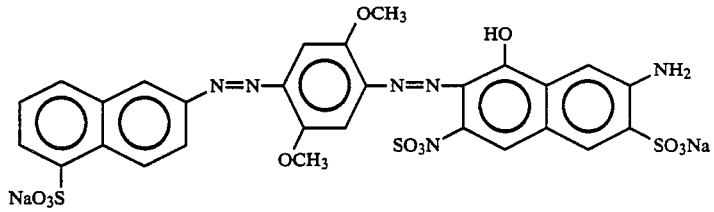

was obtained.

(4) Preparation of the third diazo liquid:

The third diazo liquid was prepared by repeating step (5) in Synthesis Example 1 except that 19.6 g of the disazo compound obtained in step (3) was used as the starting material.

(5) Third coupling:

Step (6) in Synthesis Example 1 was repeated except that the third diazo liquid obtained in step (4) was coupled with 1,3-diamine-benzene-4-sulfonic acid. The end compound (No. 1-3 in Table 1) was obtained in an amount of 20.0 g (yield, 79.5%) Elemental analysis of the compound gave the following result:

|  | C | H | N |
| --- | --- | --- | --- |
| Calculated (%) | 40.6 | 2.4 | 11.2 |
| Found (%) | 40.8 | 2.3 | 11.0 |

SYNTHESIS EXAMPLE 3

Dye compounds were prepared as in Synthesis Examples 1 and 2 and their structural formulae and maximum absorption wavelengths are listed in Table 1.

SYNTHESIS EXAMPLE 4

(Synthesis of Dye No. 2-1 in Table 1)

(1) Preparation of the first diazo liquid:

Metanilic acid (17.3 g) was added to 346 ml of 3% hydrochloric acid and the mixture was stirred for 3 hours to form a uniform slurry, which was cooled to 3° C. by addition of ice (200 g). An aqueous solution of sodium nitrite (7.3 g) in water (73 ml) was added to the cooled slurry. The mixture was stirred for 1 hour at 3° C. to effect diazotization, and the residual sodium nitrite was removed by addition of sulfamic acid (3 g) so as to obtain the first diazo liquid.

(2) First coupling:

Orthoanisidine (12.3 g) having the following formula:

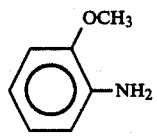

was added to 450 ml of 50% aqueous methanol. To the resulting solution, ice (300 g), the first diazo liquid prepared in step (1), and 10 ml of 25% sodium hydroxide aqueous solution were added and the mixture was stirred for 15 hours at 0°-3° C. and at a pH of 2-3 to effect coupling reaction. The mixture was then subjected to salting-out with 200 g of sodium chloride. The prepipitating monozao compound was recovered by filtration, washed with 500 ml of 10% sodium chloride aqueous solution and dried to obtain 28.2 g of a monoazo compound having the following formula:

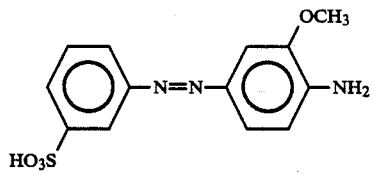

(3) Preparation of the second diazo liquid:

The monoazo compound (15.4 g) obtained in step (2) was added to 300 ml of 5% hydrochloric acid and the mixture was stirred for 5 hours to form a uniform slurry, which was cooled to 3° C. by addition of ice (250 g). An aqueous solution of sodium nitrite (3.8 g) in water (38 ml) was added to the cooled slurry. The mixture was stirred for 10 hours at 3° C. to effect diazotization, and the residual sodium nitrite was removed by addition of sulfamic acid (1 g) so as to obtain the second diazo liquid.

(4) Second coupling:

To 230 ml of water, 11.2 g of 1-amino-naphthalene-7-sulfonic acid was added. Ice (400 g), the second diazo liquid obtained in step (2) and 10 ml of 25% sodium hydroxide aqueous solution were added to the solution, and the mixture was subjected to coupling reaction at a pH of 2-3 and at a temperature fo 2°-5° C. The mixture was stirred for 5 hours at the same temperature and pH. Thereafter, the mixture was subjected to salting-out by addition of sodium chloride (100 g). The precipitating compound was recovered by filtration, washed with 300 ml of 10% sodium chloride aqueous solution and dried to obtain 23.8 g of a disazo compound having the following formula:

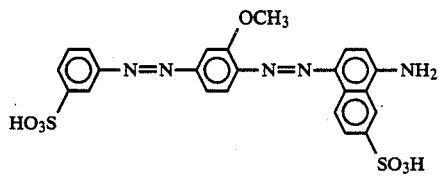

(5) Preparation of the third diazo liquid:

The disazo compound (13.5 g) obtained in step (4) was added to 300 ml of 3% hydrochloric acid and 100 ml of acetic acid. The mixture was stirred for 3 hours to form a uniform slurry, which was cooled to 3° C. by addition of ice (300 g). An aqueous solution of sodium nitrite (1.8 g) in water (20 ml) was added to the cooled slurry. The mixture was then stirred for 24 hours at 3° C. to effect diazotization, and the residual sodium nitrate was removed by addition of sulfamic acid (0.5 g) so as to obtain the third diazo liquid.

(6) Third coupling:

Eight grams of 1-hydroxy-7-amino-naphthalene-3,6-disulfonic acid was added to 320 ml of water. To the solution, 600 g of ice, the third diazo liquid obtained in step (5) and 45 ml of 25% sodium hydroxide aqueous solution were added and the mixture was subjected to coupling reaction at a pH of 8 - 10 and at a temperature of 2°-5° C. The mixture was stirred for 5 hours at the same temperature and pH, followed by salting-out with sodium chloride (250 g). The precipitating compound was recovered by filtration and washed with 400 ml of 20% sodium chloride aqueous solution to obtain 85 g of a wet cake. The cake was desalted and dried to obtain 18.3 g of the end compound (No. 2-1 in Table 2) in a yield of 76.3%. Elemental analysis of this compound gave the following result:

|  | C | H | N |
|---|---|---|---|
| Calculated (%) | 41.3 | 2.2 | 10.2 |
| Found (%) | 41.4 | 2.1 | 10.0 |

SYNTHESIS EXAMPLE 5

(Synthesis of Dye No. 2-7 in Table 2)

(1) Preparation of the first diazo liquid:

The first diazo liquid was prepared as in Step (1) in Synthesis Example 4 except that 30.2 g of 2-amino-naphthalene-4,8-disulfonic acid was used instead of metanilic acid.

(2) First coupling:

Step (2) in Synthesis Example 4 was repeated except that 18.0 g of 2-methoxy-5-acetylamino-aniline was used instead of orthoanisidine. As a result, 42.4 g of a monoazo compound having the following formula:

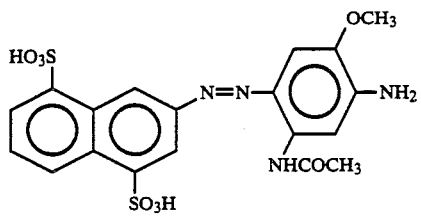

was obtained.

(3) Preparation of the second diazo liquid:

The second diazo liquid was prepared as in Synthesis Example 4 except that 24.7 g of the monoazo compound obtained in Step (2) was used as the starting amterial.

(4) Second coupling:

Step (4) in Synthesis Example 4 was repeated except that 5.4 g of orthotoluidine was used instead of 1-aminonaphthalene-7-sulfonic acid. As a result, 23.2 g of a diazo compound having the following formula:

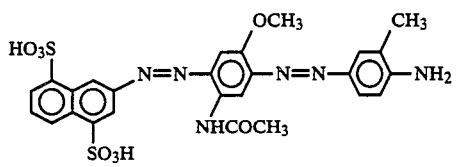

was obtained.

(5) Preparation of the third diazo liquid:

The third diazo liquid was prepared as in step (4) in Synthesis Example 4 except that 15.3 g of the disazo compound obtained in Step (4) was used.

(6) Third coupling:

The procedures of step (6) in Synthesis Example 4 were repeated except that 9.9 g of 1-hydroxy-7-(3'-sulfophenyl)aminonaphthalene-3-sulfonic acid was used instead of 1-hydroxy-7-amino-naphthalene-3,6-sulfonic acid. As a result, 19.6 g of the end compound (Dye No. 2-7 in Table 2) was obtained in a yield of 71.1%. Elemental analysis of this compound gave the following result:

|  | C | H | N |
|---|---|---|---|
| Calculated (%) | 44.7 | 2.7 | 10.2 |
| Found (%) | 44.5 | 2.7 | 10.3 |

SYNTHESIS EXAMPLE 6

Dye compounds were prepared as in Synthesis Examples 4 and 5 and their structural formulas and maximum absorption wavelengths are listed in Table 2.

TABLE 1

| Dye No. | Structural formula | Maximum absorption wavelength (in H$_2$O) (nm) |
|---|---|---|
| 1-1 | | 596 |
| 1-2 | | 568 |
| 1-3 | | 592 |
| 1-4 | | 576 |

TABLE 1-continued

| Dye No. | Structural formula | Maximum absorption wavelength (in H₂O) (nm) |
|---|---|---|
| 1-5 | M'O₃S—⟨Ph⟩—N=N—⟨Naph(SO₃M')⟩—N=N—⟨Naph(OH)(SO₃M')⟩—N=N—⟨Ph(NH₂)(NH₂)(SO₃M')⟩  M':NH₄ | 586 |
| 1-6 | H₂N—⟨Ph(NH₂)(NaO₃S)⟩—N=N—⟨Ph⟩—N=N—⟨Naph(OH)(SO₃Na)⟩—N=N—⟨Ph(NH₂)(NH₂)(SO₃Na)⟩ | 580 |
| 1-7 | H₃C—⟨Ph(SO₃Li)⟩—N=N—⟨Naph(SO₃Li)⟩—N=N—⟨Naph(OH)(SO₃Li)⟩—N=N—⟨Ph(NH₂)(NH₂)(SO₃Li)⟩ | 587 |
| 1-8 | H₃CO—⟨Ph(SO₃Na)⟩—N=N—⟨Ph(NHCOCH₃)⟩—N=N—⟨Naph(OH)(SO₃Na)⟩—N=N—⟨Ph(NH₂)(NH₂)(SO₃Na)⟩ | 580 |
| 1-9 | ⟨Ph(COONa)⟩—N=N—⟨Naph(SO₃Na)⟩—N=N—⟨Naph(OH)(SO₃Na)⟩—N=N—⟨Ph(NH₂)(NH₂)(SO₃Na)⟩ | 586 |
| 1-10 | ⟨Ph(Cl)⟩—N=N—⟨Naph(SO₃Na)⟩—N=N—⟨Naph(OH)(SO₃Na)⟩—N=N—⟨Ph(NH₂)(NH₂)(SO₃Na)⟩ | 587 |
| 1-11 | ⟨Ph⟩—N=N—⟨Naph(SO₃K)⟩—N=N—⟨Naph(OH)(SO₃K)(SO₃K)⟩—N=N—⟨Ph(NH₂)(NH₂)(SO₃K)⟩ | 585 |
| 1-12 | NaO₃S—⟨Ph⟩—N=N—⟨Naph(SO₃Na)⟩—N=N—⟨Naph(OH)(SO₃Na)⟩—N=N—⟨Ph(NH₂)(NH₂)(SO₃Na)⟩ | 580 |

TABLE 1-continued

| Dye No. | Structural formula | Maximum absorption wavelength (in H$_2$O) (nm) |
|---|---|---|
| 1-13 | | 585 |
| 1-14 | M':NH(C$_2$H$_4$OH)$_3$ | 565 |
| 1-15 | | 562 |
| 1-16 | | 570 |
| 1-17 | M':NH(CH$_3$)$_3$ | 570 |
| 1-18 | | 580 |
| 1-19 | | 602 |

TABLE 2

| Dye No. | Structural formula | Maximum absorption wavelength (in H₂O) (nm) |
|---|---|---|
| 2-1 | 3-NaO₂S-C₆H₄-N=N-(4-OCH₃-C₆H₃)-N=N-(6-SO₃Na-naphthyl)-N=N-(1-OH, 3-SO₃Na, 6-NH₂, 7-SO₃Na-naphthyl) | 615 |
| 2-2 | 3-NaO₃S-C₆H₄-N=N-(4-OCH₃-C₆H₃)-N=N-(2-CH₃-C₆H₃)-N=N-(1-OH, 3-SO₃Na, 6-NH-C₆H₄-3-SO₃Na-naphthyl) | 486 |
| 2-3 | (2-OCH₃, 5-SO₃Na-C₆H₃)-N=N-(6-SO₃Na-naphthyl)-N=N-(2-CH₃-C₆H₃)-N=N-(1-OH, 3-SO₃Na, 6-NH₂, 7-SO₃Na-naphthyl) | 580 |
| 2-4 | LiO₃S-C₆H₄-N=N-(6-SO₃Li-naphthyl)-N=N-(4-OCH₃-C₆H₃)-N=N-(1-OH, 3-SO₃Li, 6-NH₂, 7-SO₃Li-naphthyl) | 594 |
| 2-5 | HN₃COCHN-C₆H₄-N=N-(6-SO₃K-naphthyl)-N=N-(4-OCH₃, 2-CH₃-C₆H₂)-N=N-(1-OH, 3-SO₃K, 6-NH₂-naphthyl) | 600 |
| 2-6 | LiO₃S-C₆H₄-N=N-(4-OCH₃-C₆H₃)-N=N-(4-OCH₃, 2-OCH₃-C₆H₂)-N=N-(1-OH, 3-SO₃Li, 6-NH₂, 7-SO₃Li-naphthyl) | 624 |
| 2-7 | (5-NaO₃S, 8-SO₃Na-naphthyl)-N=N-(4-OCH₃, 2-NHCOCH₃-C₆H₂)-N=N-(2-CH₃-C₆H₃)-N=N-(1-OH, 3-SO₃Na, 6-NH-C₆H₄-3-SO₃Na-naphthyl) | 585 |
| 2-8 | (4-CH₃, 2-SO₃M'-C₆H₃)-N=N-(6-SO₃M'-naphthyl)-N=N-(4-OCH₃, 2-OCH₃-C₆H₂)-N=N-(1-OH, 3-SO₃M', 6-NH-C₆H₄-3-SO₃M'-naphthyl) | 620 |

M': NH₄

TABLE 2-continued

| Dye No. | Structural formula | Maximum absorption wavelength (in H₂O) (nm) |
|---|---|---|
| 2-9 | | 602 |
| 2-10 | M': NH(C₂H₄OH)₃ | 580 |
| 2-11 | | 617 |
| 2-12 | M': NH(CH₃)₃ | 590 |
| 2-13 | | 620 |
| 2-14 | | 620 |
| 2-15 | | 625 |
| 2-16 | | 585 |

TABLE 2-continued

| Dye No. | Structural formula | Maximum absorption wavelength (in H₂O) (nm) |
|---|---|---|
| 2-17 | [structure with SO₃Na, N=N, OCH₃, CH₃, SO₃Na, HO, NHC₄H₉] | 605 |
| 2-18 | [structure with OCH₃, N=N, HO, NH₂, SO₃Na] | 587 |
| 2-19 | [structure with SO₃Li, CH₃, N=N, SO₃Li, HO, NH₂] | 584 |
| 2-20 | [structure with SO₃Na, C₂H₅, OCH₃, N=N, HO, NH-C₆H₄-SO₃Na, OCH₃, SO₃Na] | 605 |

EXAMPLE 1

| | |
|---|---|
| Ion-exchanged water (hereinafter, is referred simply to as water) | 71 wt. parts |
| Diethylene glycol | 25 wt. parts |
| Dye No. 1-1 | 4 wt. parts |
| Total | 100 wt. parts |

The foregoing components were sufficiently mixed in a vessel to dissolve the solid components and after filtering the mixture with a Teflon filter having micro pores of 1 micron of pore size under pressure, the filtrate was subjected to a degassing treatment using a vacuum pump to provide a recording liquid. The recording liquid thus obtained was subjected to following tests $T_1$ to $T_5$ using a recording device having on-demand type ink-jet recording heads for discharging droplets of a recording liquid by a piezo electric oscillator (the discharging orifice diameter of 50 microns, the piezo electric oscillator driving voltage of 60 volts, and the frequency of 4 KHz). The results were all satisfactory. In addition, when the same procedure as mentioned above was followed using Dye No. 2-1 in palce of Dye No. 1-1 good results were obtained in all the test.

Test $T_1$: Long storage stability of recording liquid:

When the recording liquid was stored for 6 months at $-30°$ C. and $60°$ C. in a closed glass container, the deposition of insoluble matters was not observed and the properties and color tone of the liquid were unchanged.

Test $T_2$: Discharging stability:

When recording was performed by continuously ejecting the recording liquid for 24 hours in an atmosphere of room temperature, $5°$ C. and $40°$ C., high-quality recording could be stably performed throughout the test period under each condition.

Test $T_3$: Discharging response:

When the intermittent discharging of the recording liquid at two-second interval and the discharging after allowing to stand the recording liquid for 2 months were tested, no orifice top clogging occurred and stable and uniform recording was performed in each case.

Test $T_4$: Quality of recorded images:

The recorded images had high density and were clear. The density reduction percentage of the recorded images after exposing the images to a room lamp for 3 months was less than 1%. Also, when the recorded images were immersed in water for one minute, blotting of the images was very little.

Test $T_5$: Fixability for various kinds of recording media:

Recorded images formed on each on each of the recording papers shown in the following table were rubbed with a finger after 15 seconds since recording and the shift and blotting of the rubbed parts of the images were inspected. In each case, neither shift nor blotting of the images was observed, which showed the excellent fixability of the recording liquid.

| Tradename of paper | Paper grade | Maker |
|---|---|---|
| Ginwa | High quality paper | Sanyo Kokusaku Pulp Co., Ltd. |
| Seven Star | High quality paper | Hokuetsu Seishi K.K. |
| Haku Botan | Medium quality | Honshu Seishi K.K. |
| Toyo Filter | Non-sized paper | Toyo Roshi K.K. |

-continued

| Tradename of paper | Paper grade | Maker |
|---|---|---|
| Paper No. 4 | | |

EXAMPLE 2

| Water | 62 wt. parts |
|---|---|
| N—methyl-2-pyrrolidone | 15 wt. parts |
| Diethylene glycol | 19 wt. parts |
| Dye No. 1-3 | 4 wt. parts |
| Total | 100 wt. parts |

A recording liquid having the above components was prepared by the same manner as in Example 1 and subjected to Test $T_1$ to $T_5$ as in Example 1 using a recording device having an on-demand type multiple head (the discharging orifice diameter of 35 microns, the heating resistor resistance of 150Ω, the driving voltage of 30 volts, and frequency of 2 KHz) for recording by applying thermal energy to a recording liquid in the recording head to generate droplets of the recording liquid. The results are excellent in all the tests. The same procedure of this example was followed using Dye No. 2-5 in place of by No. 1-3 and the excellent results were obtained in all the tests.

EXAMPLE 3

| Water | 45 wt. parts |
|---|---|
| Ethylene glycol | 20 wt. parts |
| 1,3-Dimethyl-2-imidazolidinone | 30 wt. parts |
| Dye No. 1-8 | 5 wt. parts |
| Total | 100 wt. part |

A recording liquid having the above composition was prepared by the same manner as in Example 1 and subjected to Tests $T_1$ to $T_5$ as in Example 2. The results were excellent in all the tests. This example was followed in the same manner except using Dye No. 2-7 in place of Dye No. 1-8 and the excellent results were obtained in all the tests.

EXAMPLE 4

| Water | 60 wt. parts |
|---|---|
| Diethylene glycol | 36 wt. parts |
| Dye No. 1-10 | 4 wt. parts |
| Total | 100 wt. parts |

A recording liquid having the above components was prepared by the same manner as in Example 1 and subjected to Test $T_1$ to $T_5$ as in Example 2. The results were excellent in all the tests. This example was followed in the same manner except using Dye No. 2-10 in place of Dye No. 1-10 and the good results were obtained in all the tests.

EXAMPLE 5

| Water | 66 wt. parts |
|---|---|
| Diethylene glycol mono-methyl ether | 30 wt. parts |
| Dyne No. 1-11 | 4 wt. parts |
| Total | 100 wt. parts |

A recording liquid having the above components was prepared by the same manner as in Example 1 and subjected to Tests $T_1$ to $T_5$ as in Example 2. The results were excellent in all the tests. The same procedure of this example was followed using Dye No. 2-11 in place of Dye No. 1-11 and the good results were obtained in all the test.

EXAMPLE 6 TO 13

Recording liquids having the components shown in Table 3 below as Examples 6 to 13 were prepared by the same manner as in Example 1. Each of the recording liquids was filled in a felt pen and after writing on a medium quality paper (Haku Botan, trade name, made by Honshu Seishi K. K.) using each recording liquid, the water resistance of the written images was tested. Furthermore, the writing property of each recording liquid after allowing to stand the felt pen for 24 hours without the cap was tested.

The recording liquids in the examples were excellent in water resistance and writing property after allowing to stand.

TABLE 3

| Example No. | Recording liquid compounent | Wt. part |
|---|---|---|
| 6 | Water | 71 |
| | Diethylene glycol | 25 |
| | Dye No. 1-2 or 2-3 | 4 |
| | Total | 100 |
| 7 | Water | 45 |
| | Ethylene glycol | 20 |
| | N—methyl-2-pyrrolidone | 30 |
| | Dye No. 1-13 or 2-13 | 5 |
| | Total | 100 |
| 8 | Water | 60 |
| | Ethylene glycol monomethyl ether | 35 |
| | Dye No. 1-15 or 2-15 | 5 |
| | Total | 100 |
| 9 | Water | 76 |
| | Diethylene glycol | 20 |
| | Dye No. 1-18 or 2-18 | 4 |
| | Total | 100 |
| 10 | Water | 60 |
| | N—methyl-2-pyrrolidone | 15 |
| | Ethylene glycol dimethyl ether | 20 |
| | Dye No. 1-4 or 2-20 | 5 |
| | Total | 100 |
| | Water | 71 |
| | Diethylene glycol | 25 |
| | Dye No. 1-9 or 2-2 | 4 |
| | Total | 100 |
| 11 | Water | 60 |
| | Ethylene glycol monomethyl ether | 35 |
| | Dye No. 1-17 or 2-4 | 5 |
| | Total | 100 |
| 12 | Water | 60 |
| | N—methyl-2-pyrrolidone | 15 |
| | Ethylene glycol dimethyl ether | 20 |
| | Dye No. 1-19 or 2-16 | 5 |
| | Total | 100 |

The procedures of Example 6 were repeated except that dye compound No. 1-2 was replaced by No. 1-5, 1-6, 1-7, 1-12, 1-14 or 1-16. The recording liquid prepared were subjected to tests ($T_1$) to ($T_5$) as in Example 1 and the results were satisfactory in all tests.

The procedures of Example 6 were repeated except that dye compound No. 2-3 was replaced by No. 2-6, 2-8, 2-9 or 2-17. In addition, the procedures of Example 2 were repeated except that dye compound No. 2-5 was replaced by No. 2-10, 2-12, 2-14 or 2-19. The recording liquids prepared were subjected to tests ($T_1$) to ($T_5$) as in Example 1 and the results were satisfactory in all tests.

While the invention has been described in detail and with reference to specified embodiments thereof, it will be apparent to one skilled in the art that various changes and modifications can be made therein without departing from the spirit and scope thereof.

What is claimed is:

1. A naphthalene trisazo compound represented by the formula (II):

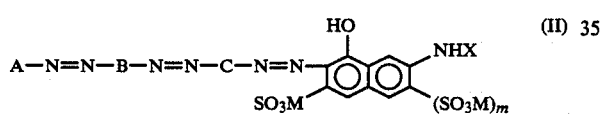

wherein X represents hydrogen, lower alkyl, phenyl, or phenyl substituted with —SO₃M;
m is zero or 1;
M represents alkali metal, ammonium or H.Am (wherein Am represents amine); and
A represents an unsubstituted or substituted benzene or naphthalene ring, B and C each represent an unsubstituted or substituted 1,4-phenylene or 1,4-naphthalene provided that B and C do not represent a naphthalene ring at the same time; that the substituents for each of A, B and C in formula (II) are one or more substituents selected from the group consisting of —SO₃M, lower alkyl, lower alkoxy, lower alkyl carbonylamino, —COOM, and halogen; and that none of A, B and C contain a hydroxy or an unsubstituted amino group.

2. The naphthalene trisazo compound as claimed in claim 1, wherein A in formula II represents an —SO₃M substituted phenyl which is unsubstituted or substituted with lower alkyl or lower alkoxy; B is phenyl substituted with lower alkyl or lower alkoxy; C represents an —SO₃M substituted naphthyl or phenyl substituted with lower alkyl or lower alkoxy; and X represents hydrogen or —SO₃M substituted phenyl.

3. The naphthalene trisazo compound as claimed in claim 1, wherein M represents Na or Li.

4. The naphthalene trisazo compound as claimed in claim 1, wherein A in formula (II) is —SO₃M substituted phenyl; B is phenyl substituted with lower alkoxy; C is —SO₃M substituted naphthyl; X is hydrogen or —SO₃M substituted phenyl; and M is Na.

5. The naphthalene trisazo compound as claimed in claim 1 which is represented by the following structural formula:

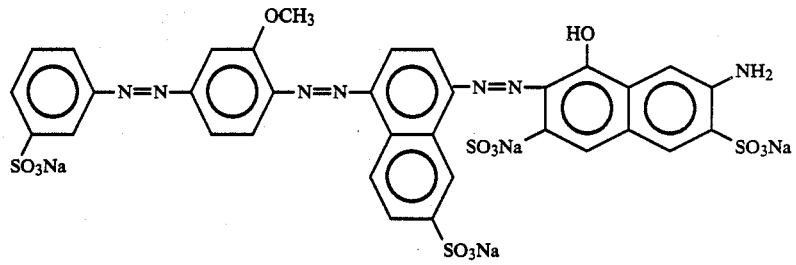

6. The naphthalene trisazo compound as claimed in claim 1 which is represented by the following structural formula:

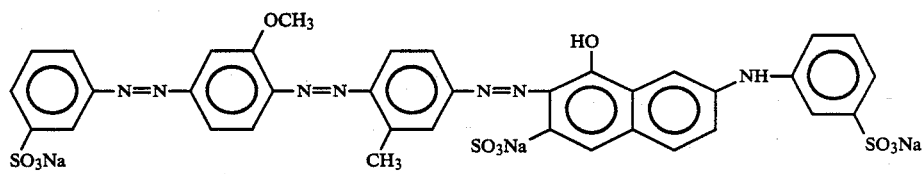

7. The naphthalene trisazo compund as claimed in claim 1 which is represented by the following structural formula:

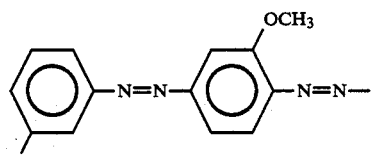

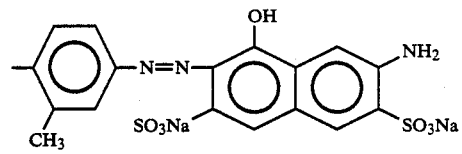

8. A recording liquid comprising a recording agent as a recording-image forming component and a liquid medium for dissolving or dispersing said recording agent, wherein said recording agent comprises at least one napthalene trisazo compound selected from the group consisting of compounds represented by the formula (I) or (II):

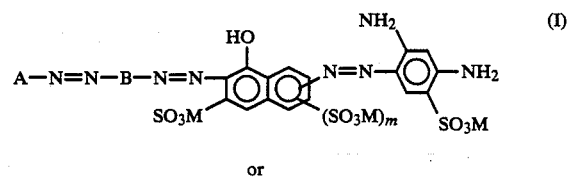

or

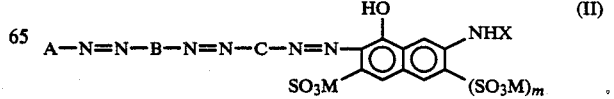

wherein
- X represents hydrogen, lower alkyl, phenyl or phenyl substituted with —SO₃M;
- m is zero or 1;
- M represents an alkali metal, ammonium or H.Am (wherein Am represents amine); and
- wherein in formula (I), A is a —SO₃M substituted naphthyl group, and B is phenyl substituted by at least one substituent selected from the group consisting of lower alkyl and lower alkoxy, and in formula (II), A represents an unsubstituted or substituted benzene or naphthalene ring; B and C each represent an unsubstituted or substituted 1,4-phenylene or 1,4-naphthalene provided that B and C do not represent a naphthalene ring at the same time; that the substituents for each of A, B and C in formula (II) are one or more substituents selected from the group consisting of —SO₃M, lower alkyl, lower alkoxy, lower alkyl carbonylamino, —COOM, and halogen; and that none of A, B and C contain a hydroxy or an unsubstituted amino group.

9. The recording liquid as claimed in claim 8, wherein said recording agent is a naphthalene trisazo compound represented by the formula (I):

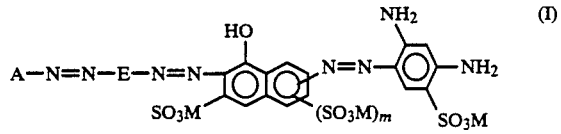

wherein A is a —SO₃M substituted naphthyl group, and B is phenyl substituted by at least one substituent selected from the group consisting of lower alkyl and lower alkoxy; m is zero or 1; and M represents an alkali metal, ammonium or H.AM (wherein Am represents amine).

10. The recording liquid as claimed in claim 8, wherein A in the formula (II) represents an —SO₃M substituted phenyl which is unsubstituted or substituted with a substituent selected from the group consisting of lower alkyl or lower alkoxy; B is phenyl substituted with lower alkyl or lower alkoxy; C represents an —SO₃M substituted naphthyl or phenyl substituted with lower alkyl or lower alkoxy; and X represents hydrogen or —SO₃M substituted phenyl.

11. The recording liquid as claimed in claim 8, wherein M in the formulae (I) and (II) represents Na or Li.

12. The recording liquid as claimed in claim 8, wherein said recording agent is selected from the group consisting of the compounds having the following structural formulae:

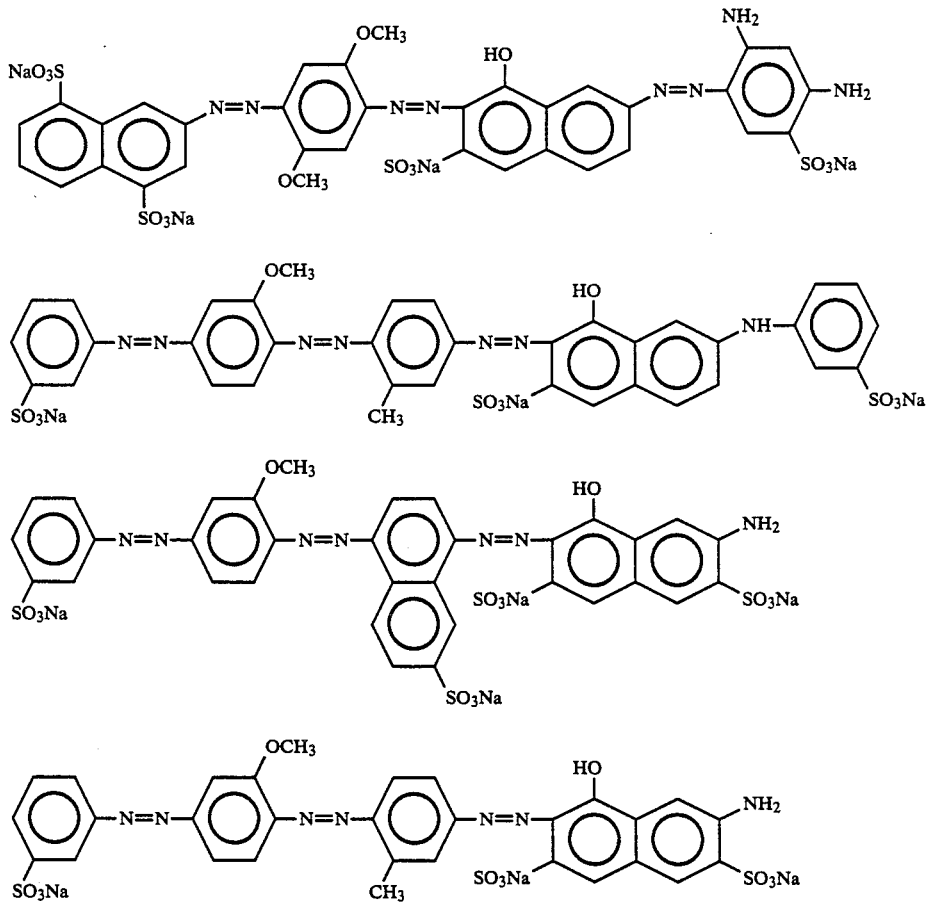

13. The recording liquid as claimed in claim 8, wherein said liquid medium is a liquid selected from the group consisting of water and a mixture of water and a water-soluble organic solvent.

14. The recording liquid as claimed in claim 8, wherein the content of said compound is 0.1 to 20% by weight to the total weight of the recording liquid.

15. The recording liquid as claimed in claim 8, wherein the content of the water-soluble organic solvent is 5 to 89.5% by weight to the total weight of the recording liquid.

16. The recording liquid as claimed in claim 8, wherein the liquid medium is a mixture of water and a water-soluble organic solvent, and the content of water is 10 to 90% by weight to the total weight of the recording liquid.

17. The recording liquid as claimed in claim 8, wherein the recording liquid further contains at least one of a viscosity controlling agent, a surface active agent, a surface tension controlling agent, a pH controlling agent, a fungicide agent, and a specific resistance controlling agent.

* * * * *

UNITED STATES PATENT AND TRADEMARK OFFICE
CERTIFICATE OF CORRECTION

PATENT NO. : 4,841,037
DATED : June 20, 1989
INVENTOR(S) : TOKUYA OHTA, ET AL.　　　Page 1 of 6

It is certified that error appears in the above-identified patent and that said Letters Patent is hereby corrected as shown below:

IN [54] TITLE

"AMINO SULFONAPHTHOLTRISAZO" should read --AMINO, SULFONAPHTHOLTRISAZO--.

COLUMN 1

Line 2, "AMINO SULFONAPHTHOLTRISAZO" should read --AMINO, SULFONAPHTHOLTRISAZO--.
Line 34, "of" should read --for--.
Line 42, "medum" should read --medium--.

COLUMN 2

Line 29, "Jaspanese" should read --Japanese--.

COLUMN 3

Line 54, "amine):" should read --amine);--.
Line 65, "atom, H.Am" should read --atom, an ammonium or H.Am--.

COLUMN 5

Line 36, "fomrula (IV):" should read --formula (V):--.
Line 43, "material" should read --mineral--.

COLUMN 6

Line 58, "meduim" should read --medium--.
Line 60, "water soluble" should read --water-soluble--.

UNITED STATES PATENT AND TRADEMARK OFFICE
CERTIFICATE OF CORRECTION

PATENT NO. : 4,841,037

DATED : June 20, 1989

INVENTOR(S) : TOKUYA OHTA, ET AL.

It is certified that error appears in the above-identified patent and that said Letters Patent is hereby corrected as shown below:

COLUMN 7

Line 2, "for" should read --of--.
Line 4, "hav" should read --have--.
Line 12, "cause" should read --causes--.
Line 24, "etc. the" should read --etc. The--.

COLUMN 8

Line 22, "benziosthiazolin-3-one," should read --benzisothiazolin-3-one,--.
Line 40, "possess" should read --possesses--.
Line 54, "Then," should read --Now,--.

COLUMN 9

Line 4, "means 9" should read --means 9,--.
Line 21, "same" should read --the same--.
Line 23, "a" should read --an--.
Line 37, "heating head 13" should read --heating head 15--.
Line 46, "charging" should be deleted.
Line 58, "glass glass 27" should read --glass plate 27--.
Line 61, "cross sectional" should read --cross-sectional--.
Line 63, "cross sectional" should read --cross-sectional--.

UNITED STATES PATENT AND TRADEMARK OFFICE
CERTIFICATE OF CORRECTION

PATENT NO. : 4,841,037
DATED : June 20, 1989
INVENTOR(S) : TOKUYA OHTA, ET AL.

It is certified that error appears in the above-identified patent and that said Letters Patent is hereby corrected as shown below:

COLUMN 10

Line 65, "hyddrox-" should read --hydrox- --.

COLUMN 11

Line 4, "chlroide" should read --chloride--.
    Line 5, "formula;" should read --formula:--.
    Line 23, "wter (20ml)" should read --water (20ml)--.
    Line 25, "diazodization," should read --diazotization,--.
    Line 60, "SYNTHESIS EXAPMLE 2" should read --SYNTHESIS EXAMPLE 2--.

COLUMN 12

Line 25, "(2) Prepration" should read --(2) Preparation--.

COLUMN 13

Line 36, "prepipitating" should read --precipitating--.
    Line 66, "fo" should read --of--.

COLUMN 23

TABLE 2-continued, Dye No. 2-13, "$OC_2HN_5$" should read --$OC_2H_5$--.

UNITED STATES PATENT AND TRADEMARK OFFICE
CERTIFICATE OF CORRECTION

PATENT NO. : 4,841,037
DATED : June 20, 1989
INVENTOR(S) : TOKUYA OHTA, ET AL.

It is certified that error appears in the above-identified patent and that said Letters Patent is hereby corrected as shown below:

COLUMN 25

Line 58, "test." should read --tests.--.

COLUMN 26

Line 53, "on each" (second occurrence) should be deleted.

COLUMN 27

Line 18, "Test $T_1$ to $T_5$" should read --Tests $T_1$ to $T_5$--.
Line 27, "by" should be deleted.
Line 55, "Test $T_1$ to $T_5$" should read --Tests $T_1$ to $T_5$--.
Line 65, "Dyne No. 1-11" should read --Dye No. 1-11--.

COLUMN 28

Line 7, "test." should read --tests.--.
Line 9, "EXAMPLE 6 TO 13" should read --EXAMPLES 6 TO 13--.
TABLE 3, Line 25, "compounent" should read --component--.

UNITED STATES PATENT AND TRADEMARK OFFICE
CERTIFICATE OF CORRECTION

PATENT NO. : 4,841,037
DATED : June 20, 1989
INVENTOR(S) : TOKUYA OHTA, ET AL.

It is certified that error appears in the above-identified patent and that said Letters Patent is hereby corrected as shown below:

COLUMN 28

TABLE 3, "Example No." should read --Example No.--

| "Example No." | --Example No.-- |
|---|---|
| 6 | 6 |
| 7 | 7 |
| 8 | 8 |
| 9 | 9 |
| 10 | 10 |
|  | 11 |
| 11 | 12 |
| 12 | 13 |

Line 60, "recording liquid" should read --recording liquids--.

COLUMN 30

Line 30, "compund" should read --compound--.
Line 52, "napthalene" should read --naphthalene--.

COLUMN 32

Line 4, "A—N=N—E—N=N" should read --A—N=N—B—N=N--.
Line 12, "H.AM" should read --H.Am--.

UNITED STATES PATENT AND TRADEMARK OFFICE
CERTIFICATE OF CORRECTION

PATENT NO. : 4,841,037

DATED : June 20, 1989

INVENTOR(S) : TOKUYA OHTA, ET AL.    Page 6 of 6

It is certified that error appears in the above-identified patent and that said Letters Patent is hereby corrected as shown below:

COLUMN 33

Line 8, "5 to 89.5%" should read --5 to 89.9%--.

Signed and Sealed this

Twenty-first Day of November, 1989

Attest:

JEFFREY M. SAMUELS

Attesting Officer    Acting Commissioner of Patents and Trademarks

UNITED STATES PATENT AND TRADEMARK OFFICE
CERTIFICATE OF CORRECTION

PATENT NO : 4,841,037

DATED : June 20, 1989

INVENTOR(S) : TOKUYA OHTA, ET AL.

It is certified that error appears in the above-identified patent and that said Letters Patent is hereby corrected as shown below:

On the title page
In [30] Foreign Application Priority date:

"61-126987" should read --60-126987--

"61-126988" should read --60-126988--

"61-126990" should read --60-126990--

"61-126991" should read --60-126991--

Signed and Sealed this

Thirtieth Day of January, 1990

Attest:

JEFFREY M. SAMUELS

Attesting Officer — Acting Commissioner of Patents and Trademarks